July 7, 1936.  D. A. BAKER  2,046,864
FILTERING APPARATUS
Filed July 6, 1933
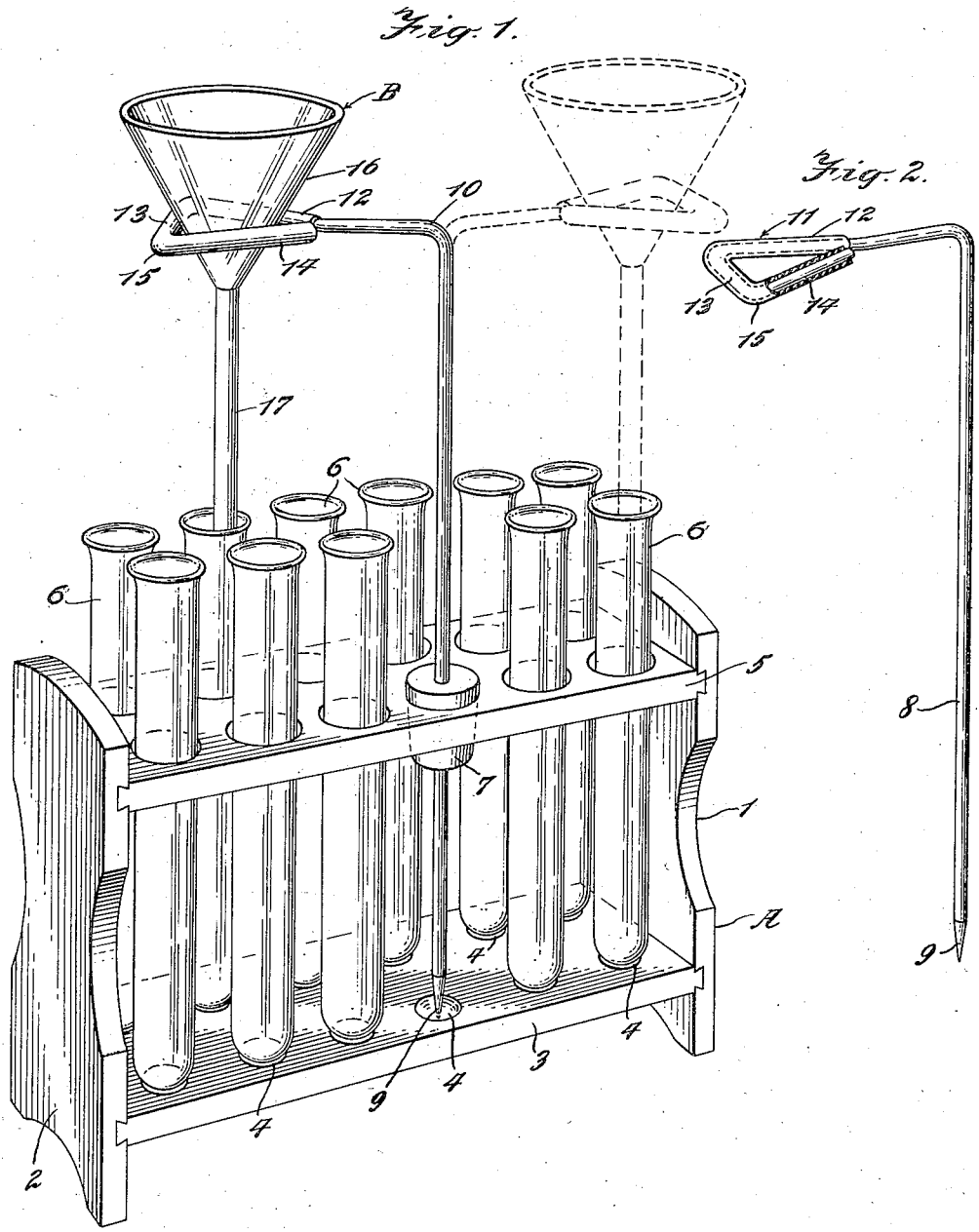
Douglas A Baker
INVENTOR Patented July 7, 1936

2,046,864

UNITED STATES PATENT OFFICE 2,046,864

FILTERING APPARATUS

Douglas A. Baker, New York, N. Y.

Application July 6, 1933, Serial No. 679,209

3 Claims. (Cl. 23—292)

This invention has reference to filtering apparatus and relates more particularly to a combination and means whereby a funnel is supported in conjunction with one or several receptacles, such as test tubes or the like, in such manner that a single support carrying a funnel may serve liquid to a plurality of receptacles or test tubes without the necessity of shifting the funnel supporting device.

In the past it has been the custom in laboratories and like situations, to use a wooden support, but the life of the wooden support is short, in addition to the same being bulky.

Also, iron rings have been used in many supports and which, even when used with porcelain rings inside the same have resulted in chemicals coming in contact with the iron ring and contaminating solutions to such an extent that proper analysis is jeopardized; and furthermore, the porcelain rings which are used are rather expensive and easily broken.

In addition, with such supports as are above mentioned it is necessary to move the stand or adjust the stand in shifting the filtering funnel from one test tube or receptacle to another with the result that solutions are spilled and furthermore a long tube must be used on the funnel as a consequence of which, when the stem of the funnel is removed from the receptacle or test tube, the receptacle or test tube has a decreased level of fluid in it due to the displacement of the stem.

Also, faster filtering is obtained when an unbroken column of liquid is preserved, due to the weight of the air pressing down on the material in the filter paper and thus, in the original use of a long stem funnel, more force is required when the funnel stem rests on the bottom of the tube, or comes adjacent the bottom of the tube by reason of the column of liquid in the stem being required to flow against the pressure of the liquid in the test tube or receptacle.

The present invention overcomes the difficulties above mentioned in that a support is provided for the funnel of such a character that it is of metal for the most part and consequently does not become warped or broken, is light to handle, and cheap to manufacture.

Furthermore, the support has its funnel holding portion completely surrounded by a chemical proof sheath which prevents any of the liquid or solution spilled over the top of the funnel from becoming contaminated by any of the material of which the support is made.

Additionally, the present invention is a combination in which an upright shaft is supported in a bearing member which permits the shaft to rotate or oscillate, and the funnel holding portion is at an angle to the shaft and consequently a short stem funnel may be used, which does not materially affect the level in the tubes, and the shaft and its contained funnel holder are moved in the bearing to position the funnel stem first over one test tube or receptacle and then another without moving the main support.

The invention has the advantage that there are no adjusting screws or loose parts to become lost or which have to be tampered with in shifting from one position to another.

A further feature of the invention is that the funnel holder is triangular in shape thereby offering a perfect three point support for the conical body of the funnel.

In the accompanying drawing forming a part of the specification, I have illustrated a preferred form of the invention and in which:

Fig. 1 is a perspective view of a test tube rack, test tubes and funnel support in assembled relation.

Fig. 2 is a perspective view of the funnel support removed from the rack and with a portion of the chemical proof covering broken away to show detail.

In detail, the invention as herein illustrated is shown in combination with the usual test tube rack A which comprises side members 1 and 2 in which are dove-tailed, or otherwise secured, the lower supporting member 3 having symmetrically arranged depressions 4 to receive the ends of test tubes and the upper perforated member 5 having its perforations corresponding in position to the depressions 4 which receive the lower ends of the test tubes.

The rack, when in use, carries a number of the usual test tubes 6. In one of the holes in the portion 5 is placed an ordinary rubber stopper 7 having an aperture through the same and this receives and forms a bearing for the round wire shank or shaft 8 of the funnel support about to be described. At its lower end 9 the shank or upright shaft 8 is pointed to obtain a proper step bearing which will not slip or roll out of position and the length of the member 7 is such as to afford adequate bearing surface lengthwise of the shaft in preventing displacement of the point 9.

At a suitable distance above the perforated member 5 the wire shank 8 is bended at right angles as indicated at 10 and is then formed into a triangular portion 11, as indicated, by the equal lengths 12, 13 and 14, which form this triangular portion in a horizontal plane.

Previous to bending, however, a suitable length of rubber or other chemical proof tubing 15 is slipped over the end of the wire shank 8 so that when the triangular head is formed the entire surface thereof is covered by this chemical proof material.

The triangular head 11, disposed in a horizontal plane, provides a perfect three point support for the conical body 16 of a funnel B, the stem 17 projecting down therebeneath to any suitable length desired but preferably falling short of the length of the test tube by a considerable amount, or in other words, the funnel stem 17 when the funnel B is in position may just enter the mouth of the test tube a half an inch or so.

In the position shown in Fig. 1 it will be noted that in using the filtering apparatus the bearing 7 and point 9 in the depression 4 provide for the swinging of the supporting head 11 through a circle in a horizontal plane corresponding to the radial length from the center point of the triangle 11 to the center of the shank or shaft 8.

By swinging the funnel support as indicated in dotted lines in Fig. 1 a number of the test tubes may be served without removing the bearing member 7 from its position, but in order to reach other test tubes 6 in the rack A, if the rack A is a large one with a larger number of test tubes, the bearing member 7 may, from time to time, be removed from one position and inserted in another, thus providing for serving all of the test tubes without any other adjustment.

It will be seen that with this construction the triangular head 11 provides a perfect three point support for the funnel, as before stated. It also is covered, as specified, with the chemical proof tubing 15 which prevents the contamination of solutions should any chemicals come in contact with the head 11. It is furthermore simply and inexpensively constructed from a single continuous length of wire and a plain length of tubing.

While, in the foregoing, I have described a specific form of the invention for the purposes of satisfying the patent statutes, it is nevertheless to be understood that in carrying the invention into practice I may resort to any and all forms of the invention falling within the scope of the appended claims defining the same.

I claim:

1. As an article of manufacture, a funnel support comprising a shank carrying a bearing member adapted to be positioned in a receiving element, the upper end of said shank being bent at right angles and then formed into a triangular head to receive and support a funnel.

2. As an article of manufacture, a length of wire having a straight portion and a portion at right angles thereto formed into a triangular configuration to provide a three point support for a funnel, and a chemical proof covering on said triangular formation.

3. As an article of manufacture a length of wire bent at right angles on one end and then multiply bent to form a triangular head in a horizontal plane, and a chemical proof tube applied to the triangular head.

DOUGLAS A. BAKER.